W. RIGLING.
EGG TESTER.
APPLICATION FILED FEB. 8, 1912.
1,066,050.
Patented July 1, 1913.
2 SHEETS—SHEET 1.
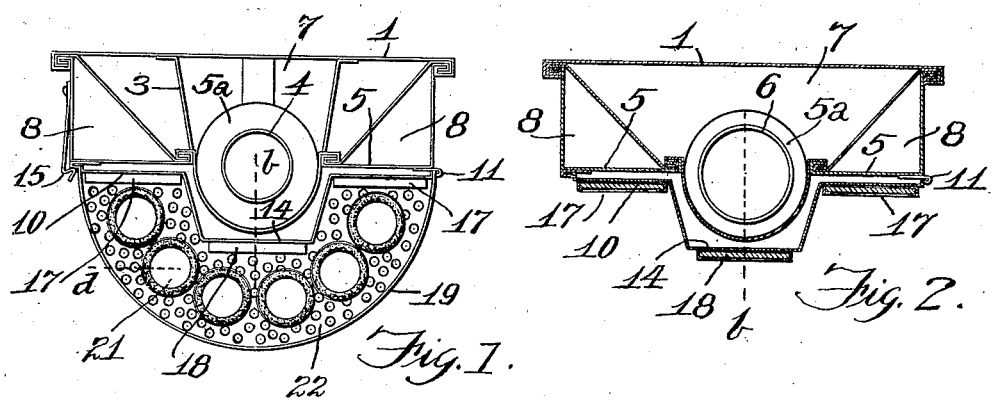
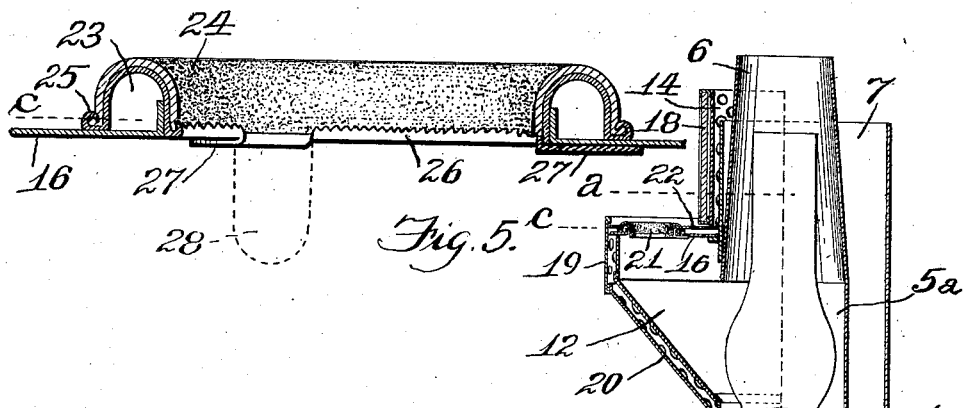
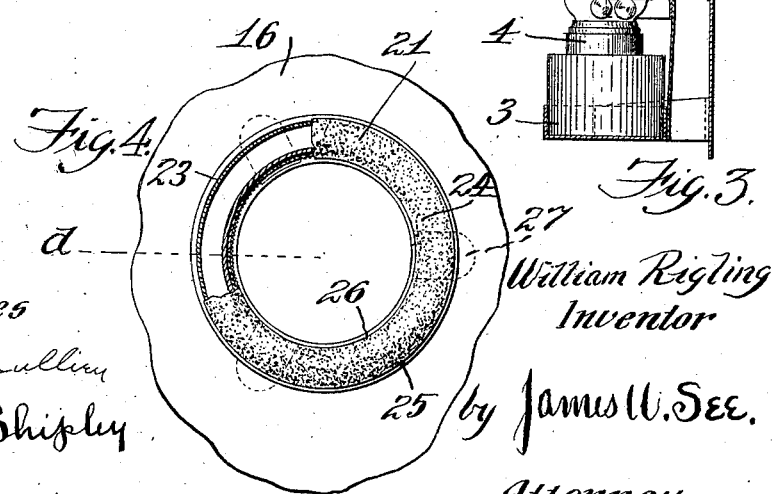
Witnesses
William Rigling
Inventor
by James W. See.
Attorney

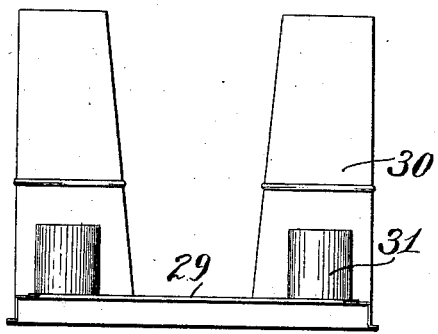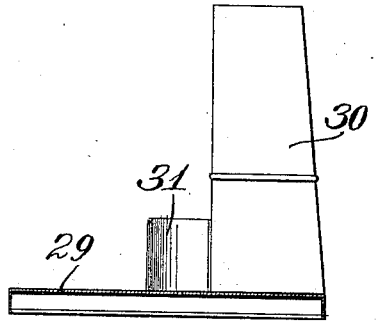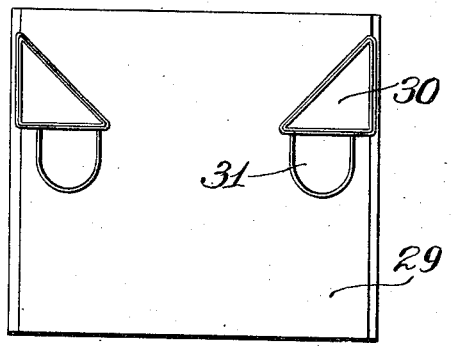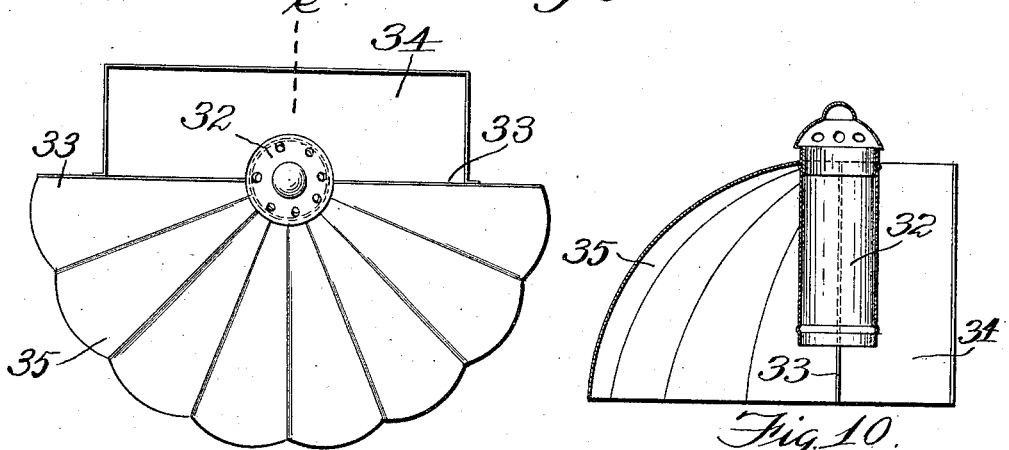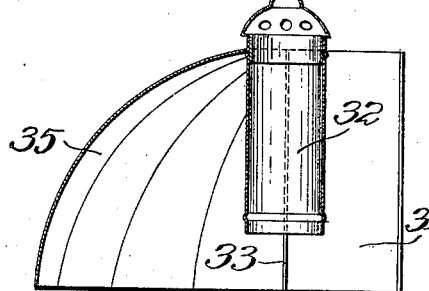

UNITED STATES PATENT OFFICE.

WILLIAM RIGLING, OF HAMILTON, OHIO.

EGG-TESTER.

1,066,050.   Specification of Letters Patent.   Patented July 1, 1913.

Application filed February 8, 1912. Serial No. 676,273.

*To all whom it may concern:*

Be it known that I, WILLIAM RIGLING, a citizen of the United States, residing at Hamilton, Butler county, Ohio, have invented certain new and useful Improvements in Egg-Testers, of which the following is a specification.

This invention pertains mainly to improvements in the egg tester set forth in United States Letters Patent No. 940,361 granted to me November 16th, 1909, it being understood, however, that not all of the features herein set forth are necessarily founded upon the disclosures of said patent.

The present improvements are designed to facilitate the proper testing of a reasonable number of eggs at one time without having one egg intercept the proper view of another; to lessen the necessity for turning the eggs during inspection; to provide for such degree of safety against fire as will satisfy underwriters' requirements; to provide for the tester being employed either as a hanging or as a standing structure; to increase the facility for testing under conditions rendering it impracticable to secure the desired degree of darkness in the testing room; to provide that the tester when not in use as a tester may be employed as an illuminating fixture; and to provide for ready substitution of egg-receiving cells as they become damaged.

The invention will be readily understood from the following description taken in connection with the accompanying drawings in which:—

Figure 1 is a plan of the tester: Fig. 2 a horizontal section of the tester in the plane of line *a* of Fig. 3: Fig. 3 a vertical section of the tester in the plane of line *b* of Figs. 3 and 4: Fig. 4 a plan of one of the egg-receiving cells, shown partly in horizontal section in the plane of line *c* of Figs. 3 and 5: Fig. 5 a diametrical section, on a very much enlarged scale, of one of the egg-receiving cells in the plane of line *d* of Figs. 1 and 4: Fig. 6 a front elevation of the separable base-structure for use with the tester when the tester is to be employed as a standing structure: Fig. 7 a side elevation of the base-structure: Fig. 8 a plan of the base-structure: Fig. 9 a plan of the separable canopy for use with the tester when the tester is to be employed in a room not satisfactorily dark: and Fig. 10 a vertical section of the canopy in the plane of line *e* of Fig. 9.

In the drawings:—1, indicates a backpiece: 3, a bracketed light holder projecting from the front of the backpiece and adapted to receive any suitable light-giving agent having a base adapted to the holder, the illustration showing an ordinary coal-oil lamp as the light-giving agent: 4, the lamp just referred to, the same being so supported by the light holder as to stand some distance forward of the backpiece and at the center of width thereof: 5, a vertical wall disposed forward of and parallel with and at some distance from the backpiece 1 and joined thereto by side-walls: 5ª, an alcove in the forward wall 5 to receive the lighting device, the relation of the wall 5 to the light-holder 3 being such that the center of the lamp or other lighting device will be substantially in the vertical plane of wall 5, the front surface of the wall of alcove 5ª being formed as a reflecting surface: 6, a chimney-hood concentrically surrounding the axis of the lamp and forming an upward prolongation of the alcove: 7, a back-flue disposed between the alcove and the backpiece, and open at its top and bottom: 8, a side flue at each side of the alcove, these side flues being formed by the front wall 5 and the side walls joining the same and by diagonal walls extending from the side extremities of the backpiece to the alcove, these side flues being triangular in cross-section and open throughout their length: 10, a wall of perforated metal disposed parallel to but some little distance from wall 5 and extending from a point at or above wall 5 down to a point just above ledge 9: 11, a hinge uniting one edge of perforated wall 10 to one side extremity of wall 5, the hinge being at that side of the alcove farthest from ledge 9: 12, a semi-frusto conical reflector with its large end upward, this reflector being connected with and ultimately supported by hinged wall 10, the lower portion of the reflector being gapped to straddle the lamp, the side edges of the reflector closing against wall 5 when the vise is closed: 14, a forwardly projecting bay formed in perforated hinged wall 10, this bay being adapted to straddle chimney-hood 6 and being also perforated, it being understood that forward wall 5 of the fixed structure is also formed with a bay projecting forwardly to straddle the chimney-hood, the bay in the perforated wall being, when the device is closed, at some little distance from the bay of wall 5: 15, a latch coöperating with the fixed structure and the hinged structure at the edges thereof farthest from the hinge: 16, a shelf projecting forwardly from perforated wall 10 and supported thereby and having its rear edge conforming to perforated wall 10 and the walls of its bay, the front edge of the shelf being semi-circular to conform with the semi-circle of the upper edge of the reflector, this shelf being provided with an arc of egg-receiving apertures, six apertures being shown in the illustration: 17, a pair of mirrors secured against the front face of perforated wall 10, one at each side of the bay thereof: 18, a mirror secured against the front face of the front wall 14 of the bay of the hinged structure: 19, a curtain of perforated metal surrounding the front edge of shelf 16, it being understood that some distance inward from this perforated wall is a curved wall joining shelf 16 to the upper edge of the reflector: 20, a perforated semi-frusto conical wall secured exterior to and at some little distance from the reflector: 21, the series of egg-receiving cells in shelf 16, which has been before referred to, this series of cells being in the form of an arc: 22, a perforated super-shelf disposed over and at some little distance from shelf 16 and provided with egg-receiving openings corresponding with those in shelf 16 below it: 23, a ring of thin metal of a size adapted for the proper reception and support of an egg to be tested, this ring being substantially semi-circular in cross-section and open at its base, there being one of these rings for each of the egg-receiving cells in the shelves: 24, a felt jacket covering the exterior of ring 23: 25, a serrated flange upon the base of the exterior of ring 23, this flange extending outwardly a trifle and then being bent upwardly and inwardly so that its serrations are indented into the base of the outside portion of the felt: 26, a similar serrated flange upon the inner wall of ring 23, the serrations of this flange engaging in a similar manner with the base of the inner portion of the felt, the inner wall of ring 23 being of such diameter as to enter the egg-receiving openings in shelf 16 while the outer wall of the ring rests upon the surface of the shelf around the egg-receiving opening therein: 27, prongs, illustrated as three in number, projecting from the inner wall of ring 23 and bent up under the shelf to hold the felt covered ring firmly to the shelf: and 28, in Fig. 7, a dotted line showing one of the prongs before it is bent up under the shelf.

Eggs are often tested in compartments, and dark compartments, littered up with straw or other egg-packing combustible material, introducing elements of danger into ordinary egg-testing devices. It is to be observed that in the present case the flue system and double wall system and perforated wall system provide for such peculiarly free circulation of air as to practically avoid the possibility of the metal of the structure, or the immediately surrounding atmosphere, becoming so hot as to do damage.

The egg-supporting shelf 16 and the reflector 12 are particularly liable to get seriously hot. The perforated outer wall 20 of the reflector, and the perforated super-shelf 22 serve in forming ventilating air passages exterior to these hot surfaces and at the same time guarding these hot surfaces from being reached by combustible litter.

When the device is swung open, the fixed portion of the structure forms an illuminating fixture, well ventilated for the sake of safety, and the alcove 5$^a$ forming a good reflector. The device may be thus opened temporarily when attention is to be given to the lighting agent or when some light is wanted in the testing room, or it may be left open for longer periods of time when testing is not going on and light is wanted.

While the lighting agent is illustrated as an ordinary coal-oil lamp fitting the holder 3, it will of course be understood that a gas burner or an incandescent electric lamp provided with a base adapted to the holder may be substituted for the coal-oil lamp.

The device having been closed up, the eggs to be tested are to be set in the egg-receiving cells and tested by sight, the arrangement of the arc of egg-receiving cells and mirrors being set so that a satisfactory view can be obtained of all portions of all eggs, no one egg seriously interfering with the satisfactory view of any of the other eggs, and no turning of the eggs being required.

It is to be observed that the egg-receiving felt-covered rings are secured to shelf 16 and that they project up through perforated super-shelf 22, the felt-covered rings fairly fitting the openings in the super-shelf. In the course of continued testing, the felt jackets of the egg-receiving cells become worn and ragged and require replacement, and in the present case this is done, not by replacing the jackets upon the rings, but by substituting new felt-covered rings. These felt-covered rings are very economically produced by machinery and, it being necessary to replace a worn ring, the prongs 27 are to be bent down so that the felt-covered ring may be removed so as to permit a new felt-covered ring to be placed and its prongs bent up under the supporting shelf.

The general structure, as thus far described, is adapted to be supported by being secured against a vertical surface. In case it be desired to employ the device on a horizontal surface then the base-structure illustrated in Figs. 6, 7, and 8 is employed. In these figures:—29, indicates a flat hollow base adapted to rest upon the table or shelf or other horizontal surface which is to support the tester: 30, a pair of hollow uprights projecting from the base and adapted to separably enter the bases of flues 8 of the tester-structure: and 31, match-holders projecting from the bases of the uprights 30.

The uprights 30 are of the same cross-section as flues 8 and their upper portions are tapered so that they will readily enter the bases of flues 8, and the uprights are provided with beads to form stops to limit the descent of the tester-structure upon the supporting base. When this supporting base is in use the open character of the ventilating flues of the tester-structure is not interfered with, the supporting base-structure as well as the tester structure being therefore well provided with protective ventilation when used together.

If the tester be employed in a testing room in which a satisfactory degree of darkness is not present, then the canopy illustrated in Figs. 11 and 12 may be employed in conjunction with the tester. In these figures:—32, indicates a chimney-extension adapted to have its base enter and be supported by the top of chimney-hood 6: 33, a wall projecting from each side of the chimney extension and adapted to rest upon and match wall 5 of the tester when the canopy is in position upon the tester: 34, a back flue to the rear of wall 33, this back-flue being formed by wall 33 and by a back-wall and connecting side walls which rest upon and match back wall 1 and the side walls of flues 8 when the canopy is in place upon the tester: and 35, a canopy having its top secured to the chimney extension and having its side edges joined to wall 33, the skirt of the canopy being of such form and dimension as to encircle the arc of egg-receiving cells but at such distance above the eggs supported by the shelf as not to interfere with the proper view of the eggs while being tested, and the skirt is preferably to be at such height, relative to the hinged structure, that the hinged portion of the tester may be swung open without removing the canopy. While the canopy does not shut out all external light it does practically shut out all otherwise seriously interfering light coming from points above the level of the canopy. The tester may be employed with the supporting base-structure alone or with the canopy alone or with both the base-structure and the canopy, and the base-structure and the canopy are readily attachable to and separable from the base-structure without the necessity for manipulating any fastenings.

I claim:—

1. An egg tester comprisig, a backpiece, a forward wall parallel therewith and united thereto by side-walls and provided with a reflecting alcove in its front, said backpiece and walls forming a vertical flue open at top and bottom, a light holder supported by the structure below the alcove in the forward wall, a lighting agent disposed in said alcove and supported by said holder, and a shelf provided with egg-receiving cells supported in front of said forward wall above the level of the lighting agent, combined substantially as set forth.

2. An egg tester comprising, a backpiece, a forward wall parallel therewith and united thereto by sidewalls and provided with a reflecting alcove in its front, said backpiece and walls forming a vertical flue open at top and bottom, vertical walls extending diagonally from the sides of the alcove to the sides of the backpiece and dividing said flue into a back portion and two side portions, a light holder supported by the structure below the alcove in the forward wall, a lighting agent disposed in said alcove and supported by said holder, and a shelf provided with egg-receiving cells supported in front of said forward wall above the level of the lighting agent, combined substantially as set forth.

3. An egg tester comprising, a backpiece, a light holder bracketed forwardly therefrom, a lighting agent removably supported in said holder, a shelf supported by said backpiece and provided with a series of egg-receiving cells disposed above and around said lighting agent, and a semi-frusto conical reflector disposed below said shelf and around the lighting agent, combined substantially as set forth.

4. An egg tester comprising, a backpiece, a light holder bracketed forwardly therefrom, a lighting agent removably supported in said holder, a shelf supported by said backpiece and provided with a series of egg-receiving cells disposed above and around said lighting agent, and a semi-frusto conical reflector disposed below and supported by said shelf and around the lighting agent, combined substantially as set forth.

5. An egg tester comprising, a backpiece, a lighting agent supported thereby, a shelf disposed in front of and around the lighting agent and provided with a series of egg-receiving cells, a hinge supported by the backpiece and connected with the shelf to permit the shelf to be swung upon a vertical axis, and a latch for holding the shelf in normal position, combined substantially as set forth.

6. An egg tester comprising, a lighting agent, a wall disposed above the lighting agent, a mirror supported by said wall at each side of and above the lighting agent, a mirror supported by said wall in a plane forward of the first-mentioned mirrors, and a shelf disposed below and forward of said mirrors and provided with a series of egg-receiving cells extending around the forward mirror, combined substantially as set forth.

7. An egg tester comprising, a holder for a lighting agent, a lighting agent supported thereby, a shelf disposed in front of and above the lighting agent and provided with a series of egg-receiving cells, and a hinge and latch uniting the shelf to the supporting agent, so combined as to admit of being used for illuminating purposes.

8. An egg tester comprising, a holder for a lighting agent, a lighting agent supported thereby, a shelf disposed in front of and above the lighting agent and provided with a series of egg-receiving cells, a hinge and latch uniting the shelf to the supporting agent, and a mirror fixed to the shelf to the rear of the egg-receiving cells and moving with the shelf upon its hinge, combined substantially as set forth.

9. An egg-tester comprising, a holder for a lighting agent, a lighting agent supported thereby, a shelf disposed above the lighting agent and provided with a curved series of egg-receiving cells, a mirror supported by said shelf to the rear of each extremity of the series of cells, a mirror supported by the shelf forward of said two mirrors, and a hinge and latch uniting the shelf and mirror structure to said support, combined substantially as set forth.

10. An egg tester comprising, two mirrors in a common plane, a mirror disposed between and forward of said two mirrors, a shelf disposed below and forward of said mirrors and provided with a curved series of egg-receiving cells, and a lighting agent disposed below said shelf and to the rear of the middle mirror, combined substantially as set forth.

11. An egg tester comprising, a supporting structure having a vertical wall, a lighting agent supported by said structure, a perforated wall forward of and separated from said vertical wall and above the lighting agent, a mirror forward of said perforated wall, and a shelf disposed forward of and below the mirror and provided with a series of egg-receiving cells, combined substantially as set forth.

12. An egg tester comprising, a supporting structure having a vertical wall, a lighting agent supported by said structure, a perforated wall forward of and separated from said vertical wall, a forwardly projecting bay in said perforated wall, a mirror supported on the front wall of said bay, mirrors supported on the perforated wall at each side of the bay and above the lighting agent, and a shelf disposed forward of and below the mirror and provided with a series of egg-receiving cells, combined substantially as set forth.

13. An egg tester comprising, a supporting structure for a lighting agent, a lighting agent supported thereby, a shelf supported by said structure forward of and above and independent of the lighting agent and provided with a series of egg-receiving cells, a semi-frusto conical reflector disposed around the lighting agent below the shelf, and a semi-frusto conical perforated wall around but separated from the reflector, combined substantially as set forth.

14. An egg tester comprising, a holder for a lighting agent, a lighting agent supported thereby, a shelf disposed around and above the lighting agent, a semi-frusto conical reflector around the lighting agent below the shelf, and a perforated super-shelf disposed above said shelf, combined substantially as set forth.

15. An egg tester comprising, a supporting structure provided with a plurality of vertical flues open at top and bottom, a lighting agent supported by said structure, a shelf disposed forward of and above the lighting agent and provided with a series of egg-receiving cells, and a reflector disposed forward of the lighting agent and below the shelf, combined substantially as set forth.

16. An egg tester comprising, a hollow ring of substantially semi-circular contour, a felt jacket covering said ring, a flange on and exterior to said ring and having inwardly presenting serrations engaging the base of the felt jacket thereon, a flange on and interior of said ring and having inwardly presenting serrations engaging the base of the inner portion of the felt jacket, a shelf having an opening adapted to the ring, and means for securing the ring separably in the opening in the shelf, combined substantially as set forth.

17. An egg tester comprising, a hollow ring of substantially semi-circular contour, a felt jacket covering said ring, a flange on and exterior to said ring and having inwardly presenting serrations engaging the base of the felt jacket thereon, a flange on and interior of said ring and having inwardly presenting serrations engaging the base of the inner portion of the felt jacket, a shelf having an opening adapted to the ring, and prongs extending from the inner portion of the ring and bent outwardly under the shelf to secure the ring separably to the shelf, combined substantially as set forth.

18. An egg tester comprising, a hollow ring, a felt jacket thereon, serrated flanges outside and inside the ring to serve in securing the felt jacket thereto, and prongs projecting from the inner portion of the ring to serve in securing the ring in an opening in an egg-supporting shelf, combined substantially as set forth.

19. An egg tester comprising, a supporting structure formed with vertical flues open at top and bottom, a lighting agent supported thereby, a shelf attached to the supporting agent and disposed above and forward of the lighting agent and provided with a series of egg-receiving apertures, and mirrors disposed above the shelf to the rear of the egg-receiving apertures, combined substantially as set forth.

20. An egg tester comprising, a supporting structure formed with vertical flues open at top and bottom, a lighting agent supported thereby, a shelf hinged and latched to the supporting agent and disposed above and forward of the lighting agent and provided with a series of egg-receiving apertures, and mirrors disposed above the shelf to the rear of the egg-receiving apertures, combined substantially as set forth.

21. An egg tester comprising, a supporting structure provided with vertical flues open at top and bottom, a lighting agent supported thereby, a shelf disposed above and forward of the lighting agent and formed with a lower wall and a perforated upper wall and provided with a series of egg-receiving cells, and a semi-frusto conical reflector disposed below the shelf and forward of the lighting agent and formed with an inner reflecting wall and a perforated outer wall, combined substantially as set forth.

22. An egg tester comprising, a supporting structure for a lighting agent, a lighting agent supported thereby, a chimney-hood supported by said structure over the lighting agent, a shelf supported by said structure at the front of and above the lighting agent and provided with a series of egg-receiving cells, a chimney extension adapted for separable connection with the top of the chimney-hood, and a canopy carried by the chimney extension and projecting out over the shelf, combined substantially as set forth.

23. An egg tester comprising, a supporting structure formed with vertical flues open at top and bottom, a lighting agent supported thereby, a shelf supported by said structure at the front of and above the lighting agent and provided with a series of egg-receiving apertures, a canopy disposed above the shelf, a flue carried by the canopy at its rear and forming upward prolongations of the flues of the supporting structure, and means for separably connecting the canopy with the supporting structure, combined substantially as set forth.

24. An egg tester comprising, a supporting structure, a lighting agent supported thereby, a shelf hinged to the supporting structure above the lighting agent and provided with a series of egg-receiving cells, a mirror carried by the shelf and projecting upwardly therefrom to the rear of the egg-receiving cells, and a canopy supported by said supporting structure and projecting over the shelf and having its skirt above the top of the mirror, whereby the shelf and mirror structure can be swung open upon its hinge without removing the canopy, combined substantially as set forth.

25. An egg tester comprising, a supporting structure having a backpiece adapted for attachment to a vertical surface, a lighting agent carried thereby, a shelf supported by said structure at the front of and above the lighting agent and provided with a series of egg-receiving cells, and a base structure separably connected with said supporting structure and adapted to support the apparatus upon a horizontal surface, combined substantially as set forth.

26. An egg tester comprising, a supporting structure formed with vertical flues open at top and bottom, a lighting agent supported thereby, a shelf disposed at the front of and above the lighting agent and provided with a series of egg-receiving cells, and a base-structure connected with said supporting structure and provided with vertical flues connected with the flues of the supporting structure, combined substantially as set forth.

27. An egg tester comprising, a supporting structure formed with vertical flues open at top and bottom, a lighting agent supported thereby, a shelf disposed at the front of and above the lighting agent and provided with a series of egg-receiving cells, and a separable base-structure having hollow uprights adapted to have their upper ends enter the lower ends of flues in the supporting structure, combined substantially as set forth.

WILLIAM RIGLING.

Witnesses:
M. S. BELDEN,
H. M. MILDERS.

Copies of this patent may be obtained for five cents each, by addressing the "Commissioner of Patents, Washington, D. C."